US008788313B2

(12) United States Patent
Schaad

(10) Patent No.: US 8,788,313 B2
(45) Date of Patent: Jul. 22, 2014

(54) DECENTRALISED AUDIT SYSTEM IN COLLABORATIVE WORKFLOW ENVIRONMENT

(75) Inventor: Andreas Schaad, Bad Pyrmont (DE)

(73) Assignee: SAP AG, Walldorf (DE)

( * ) Notice: Subject to any disclaimer, the term of this patent is extended or adjusted under 35 U.S.C. 154(b) by 3062 days.

(21) Appl. No.: 11/335,488

(22) Filed: Jan. 18, 2006

(65) Prior Publication Data

US 2007/0129982 A1 Jun. 7, 2007

(30) Foreign Application Priority Data

Dec. 5, 2005 (EP) .................................... 05292603

(51) Int. Cl.
*G06Q 10/00* (2012.01)
*G06Q 10/06* (2012.01)
*G06Q 50/18* (2012.01)
(52) U.S. Cl.
CPC ............ *G06Q 10/06* (2013.01); *G06Q 10/0633* (2013.01); *G06Q 50/188* (2013.01); *G06Q 10/063* (2013.01)
USPC ....................................................... 705/7.27
(58) Field of Classification Search
USPC ........................................................ 705/7.27
See application file for complete search history.

(56) References Cited

U.S. PATENT DOCUMENTS

| | | | | |
|---|---|---|---|---|
| 5,870,545 | A * | 2/1999 | Davis et al. ................... | 709/201 |
| 7,272,816 | B2 * | 9/2007 | Schulz et al. ................. | 717/104 |
| 7,627,631 | B2 * | 12/2009 | Blevins ........................ | 709/205 |
| 7,653,562 | B2 * | 1/2010 | Schulz et al. ................ | 705/7.27 |
| 2002/0038228 | A1 * | 3/2002 | Waldorf et al. .................... | 705/7 |
| 2002/0184070 | A1 * | 12/2002 | Chen et al. ......................... | 705/9 |
| 2003/0097286 | A1 * | 5/2003 | Skeen ................................ | 705/7 |
| 2004/0078258 | A1 * | 4/2004 | Schulz et al. ..................... | 705/9 |
| 2004/0083448 | A1 * | 4/2004 | Schulz et al. ................. | 717/101 |
| 2004/0133876 | A1 * | 7/2004 | Sproule ......................... | 717/105 |
| 2005/0283455 | A1 * | 12/2005 | Kemmer et al. .................. | 707/1 |
| 2006/0230047 | A1 * | 10/2006 | Deimel et al. ................ | 707/100 |
| 2008/0216147 | A1 * | 9/2008 | Duffy .............................. | 726/1 |

OTHER PUBLICATIONS

McClatchey, R.; Baker, N.; Harris, W.; Le Goff, J.-M.; Kovacs, Z.; Estrella, F.; Bazan, A.; Le Flour, T.; , "Version management in a distributed workflow application," Database and Expert Systems Applications, 1997. Proceedings., Eighth International Workshop on , vol., No., pp. 10-15, Sep. 1-2, 1997.*

Lichka, C.; , "Strategic monitoring and alignment to achieve business process best practices," Database and Expert Systems Applications, 2005. Proceedings. Sixteenth International Workshop on , vol., No., pp. 914-918, Aug. 22-26, 2005 ISSN : 1529-4188 Print ISBN: 0-7695-2424-9.*

(Continued)

*Primary Examiner* — Brett Feeney
*Assistant Examiner* — George H Walker
(74) *Attorney, Agent, or Firm* — Schwegman, Lundberg & Woessner, P.A.

(57) ABSTRACT

A system to manage a workflow includes a workflow model having a version, the version being executable by an execution engine as a specific workflow instance. The system includes a workflow data monitor to receive and associate audit information with an object processed by an execution engine in terms of the specific instance of the workflow model.

20 Claims, 5 Drawing Sheets

(56) References Cited

OTHER PUBLICATIONS

Groth, P., Luck, M., Moreau, L. "A protocol for recording provenance in service-oriented Grids." In: Proceedings of the 8th International Conference on Principles of Distributed Systems (OPODIS'04), vol. 3544, pp. 124-139, Grenoble, France (2004).*

M. zur Muehlen and M. Rosemann. "Workflow-based Process Monitoring and Controlling—Technical and Organizational Issues." In: Proceedings of the 33rd Hawaii International Conference on System Sciences (HICSS-33), pp. 1-10. IEEE Computer Society Press, Los Alamitos, California, 2000.*

McClatchey, R.; Baker, N.; Harris, W.; Le Goff, J.-M.; Kovacs, Z.; Estrella, F.; Bazan, A.; Le Flour, T.; , "Version management in a distributed workflow application," Database and Expert Systems Applications, 1997. Proceedings., Eighth International Workshop on, vol., No., pp. 10-15, Sep. 1-2, 1997.*

Lichka, C.; , "Strategic monitoring and alignment to achieve business process best practices," Database and Expert Systems Applications, 2005. Proceedings. Sixteenth International Workshop on , vol., No., pp. 914- 918, Aug. 22-26, 2005 ISSN : 1529-4188 Print ISBN: 0-7695-2424-9.*

Michael zur Muehlen and Michael Rosemann. "Workflow -based Process Monitoring and Controlling—Technical and Organizational Issues," Proceedings of The 33rd Hawaii International Conference on System Sciences—2000.*

Naveen N. Kulkarni, K M Senthil Kumar, and Dr. Srinivas Padmanabhuni. "Reckoning Legislative Compliances with Service Oriented Architecture—A Proposed Approach" Proceedings of the 2005 IEEE International Conference on Services Computing (SCC'05).*

Therani Madhusudan, J. Leon Zhao, Byron Marshall. "A case-based reasoning framework for workflow model management." Data & Knowledge Engineering 50 (2004) 87-115.*

W.M.R. van der Aalst. "Exterminating the Dynamic Change Bug: A Concrete Approach to Support Workflow Change," Information Systems Frontiers 3:3. 297-317. 2001.*

W.M.R. van der Aalst et al. "Process Mining and Verification of Properties: An Approach Based on Temporal Logic," R. Meersman and Z. Tari (Eds.): CoopIS/DOA/ODBASE 2005, LNCS 3760, pp. 130-147, 2005.*

W.M.R. van der Aalst. "Business alignment: using process mining as a tool for Delta analysis and conformance testing," Requirements Eng (2005) 10: 198-211, DOI 10.1007/s00766-005-0001-x.*

Z. Milosevic, S. Gibson, P. F. Linington, J. Cole, and S. Kulkarni. "On design and implementation of a contract monitoring facility." Proceedings of the First International Workshop on Electronic Contracting (WEC'04).*

"BEA workflow solution suite", http://edocs.bea.com/wlintegration/v2_1sp/bpmtutor/indes.htm. (Jan. 2002),203 pgs.

Ellis, C , et al., "Dynamic change within workflow systems", *Proceedings of the 1995 ACM Conference on Organizational Computing Systems—COOCS'95*. http://www.acm.org/pubs/citations/proceedings/cocs/224019/p10-ellis Comstock et (editors), (1995),10-21.

Reichert, M , et al., "A Framework for Dynamic Changes in Workflow Management Systems", *Proceedings of the 8th International Workshop on Database and Expert Systems Applications (DEXA 97)Toulouse, France*, (Sep. 1997),42-48.

Van Der Aalst, W. M., "Exterminating the Dynamic Change Bug: A Concrete Approach to Support Workflow Change", *Information Systems Frontiers*. 3(3), (2001),297-317.

"European Application Serial No. 0529603.7, Extended European Search Report mailed Feb. 27, 2006", 5 pgs.

"The IBM MQSeries Workflow V3.2, Staffware 2000 v8.1 and Cannot Process Engine V2.0 workflow systems review", *Section 4.2*, [Online]. Retrieved from the Internet: <URL: http://workflow-research.de/Publications/Book/Michael_zur_Muehlen_-_Workflow-based_Process_Controlling_(Web).pdf>,(2000),299 pgs.

* cited by examiner

DECENTRALISED AUDIT SYSTEM IN COLLABORATIVE WORKFLOW ENVIRONMENT

CLAIM OF PRIORITY

The present patent application claims the priority benefit of the filing date of European Application (EPO) No. 05292603.7 filed Dec. 5, 2005, the entire content of which is incorporated herein by reference.

FIELD

This application relates to a method and system to manage a collaborative workflow environment and, in one example embodiment, to a decentralised audit system for deployment in such a collaborative workflow environment.

BACKGROUND

The provisioning of auditing data is an increasing requirement in the business world, partially as a result of new legal guidelines (e.g., the Sarbanes-Oxley Act, Basel II and the Health Insurance Portability and Accountability Act (HIPAA)). While many current Enterprise Resource Planning (ERP Systems (e.g., SAP, IBM MQ Workflow or BEA Systems)) make it possible to monitor activities with respect to a workflow, a number of restrictions exist with respect to collaborative and distributed workflow systems that span organizational and technical boundaries.

SUMMARY

According to an aspect of the invention, there is provided a system to manage a workflow. The system includes a workflow model having at least one version, which is executable by an execution engine as a specific workflow instance. The system further includes a workflow data monitor to receive context information pertaining to a workflow model, to receive execution information pertaining to execution by the execution engine of the specific instance of the workflow model, and to associate the context and execution information as audit information with an object processed by an execution engine in terms of the specific instance of the workflow model.

Other features will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
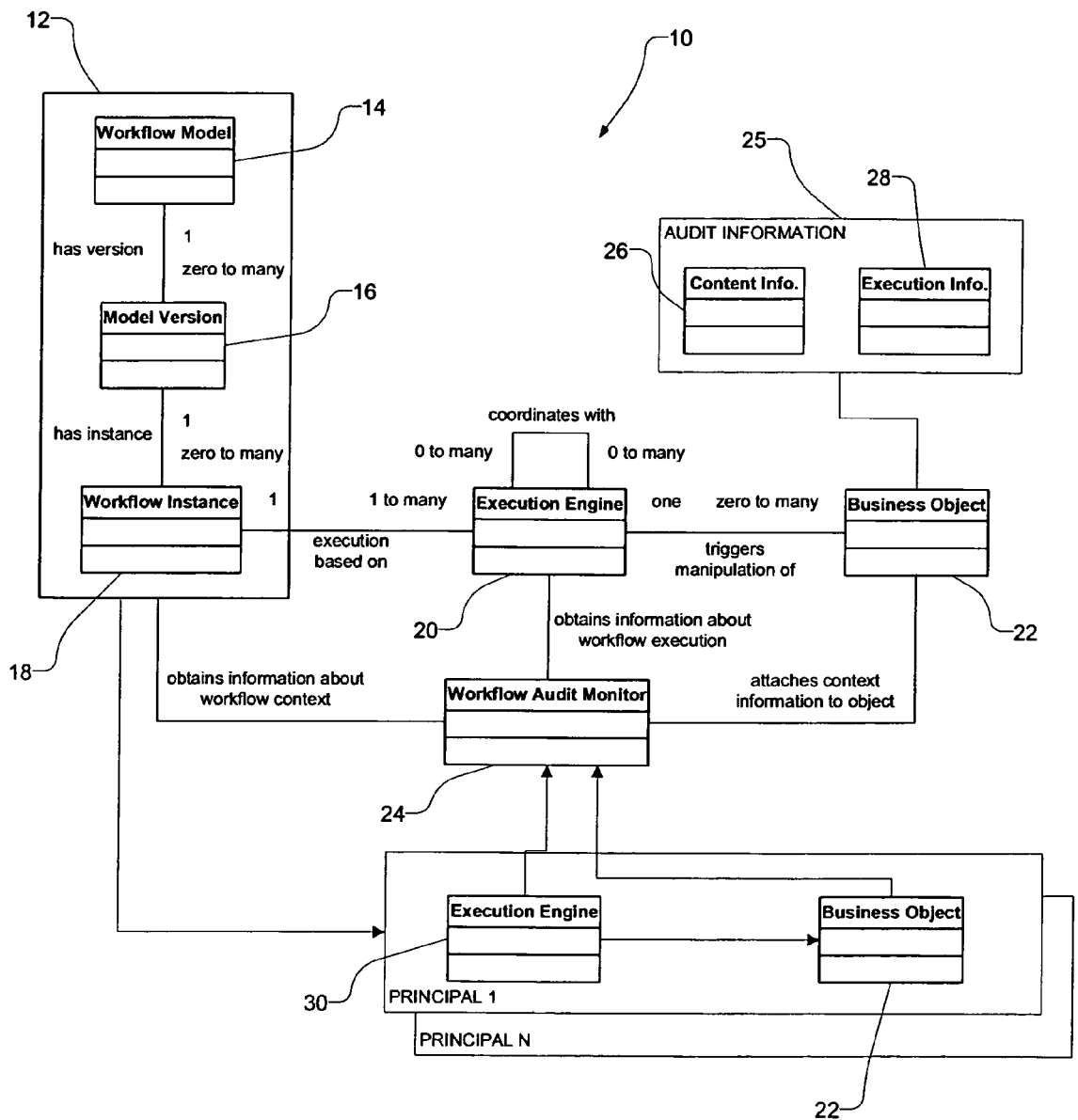
FIG. 1 is a UML diagram illustrating components of an audit system, according to an example embodiment, to facilitate audit functions in a collaborative workflow environment.

In the following description, for purposes of explanation, numerous specific details are set forth in order to provide a thorough understanding of an embodiment of the present invention. It will be evident, however, to one skilled in the art that embodiments of the present invention may be practiced without these specific details.

A workflow management system, according to an example embodiment, may enable collaboration between organizationally (or technically) distinct business partners by assuming responsibility for the definition and execution of collaborative workflows between such distinct business partners. Example embodiments of a workflow management system described below seek, inter alia, to address issues that may arise with respect to collaborative and/or distributed workflow systems that may span organizational and technical boundaries. Typically, distributed workflow systems that span multiple entities (e.g., organizational and technical entities) may not share a workflow history database. This may be because the set up of such a workflow history database, and the joint administration thereof, may not be efficient with respect to a relatively short life-time of collaboration. In addition, such a shared database may aggregate information about private processes of a particular entity (e.g., a business partner), and it may be technically difficult to specify and enforce required access control, as well as satisfying other possible privacy concerns.

Without limiting environments in which embodiments may be employed, it is useful to consider certain example issues that may arise within a collaborative and distributed workflow system. However, the below discussion should in no way be interpreted as requiring that embodiments be limited to a collaborative and distributed workflow system. Indeed, embodiments of the present invention may be deployed in a central and non-collaborative workflow system to provide audit functionality.

Returning to an example collaborative and distributed workflow system, workflow audit data may be stored and made accessible to multiple entities (e.g., principals) that collaborate with respect to a workflow system.

Example embodiments also seek to provide audit information to a principal regarding which version of a workflow model was applied in the manipulation of a business object, and also allow a principal to observe whether there was a deviation in an execution (or process) route with respect to manipulation of a business object.

In a collaborative workflow system, it will also be appreciated that principals may not necessarily have access to the specific internal workflows of their partners. In one example embodiment, while a principal may not have knowledge concerning a workflow model, or a specific instance of an execution path leading to manipulation of a business object in the workflow of a partner, a principal may be able to pose questions regarding how, and according to which version of a workflow model, a business object was manipulated.

FIG. 1 is a Unified Modeling Language (UML) diagram illustrating an audit system 10, according to an example embodiment. The audit system 10 may, in one example embodiment, be responsible for the definition and execution of collaborative workflows between distinct entities (e.g., organizationally and/or technically independent business partners). In other embodiments, the audit system 10 may of course be responsible for the definition and execution of workflows by a single entity, or entities having various degrees of integration.

For the purposes of illustration, consider an environment in which there exist a number of organizational independent entities. In such an environment, the audit system 10 may operate with a set of execution engines that execute specific instances of a version of a workflow model. Specifically, the audit system 10 is shown in FIG. 1 to include a workflow system 12 defining a general workflow model 14 that describes an overall process (e.g., an overall business process such as a loan origination process or a process for issuing life insurance). The general workflow model 14 may be subject to changes, which may be expressed in the form of a versioning relationship between the general workflow model 14 and one or more model versions 16. For example, a specific workflow model version 16 may reflect the changing of certain parameters of the workflow model 14 over an overall life-time of the model 14. Consider for example that required health checks for the issuing of life insurance may change due to changes in legislation, while the overall process still remains that of issuing a life insurance. Such changes over time in the required health checks may be reflected in one or more model versions 16 associated with the general workflow model 14.

A specific workflow model version 16 may in turn have one or more workflow instances 18, each workflow instance 18 representing a concrete instantiation of the general workflow model 14, and may involve specific entities (e.g., principals) and objects. For example, the principal "Smith" may be a responsible clerk for the life insurance case of "Miller".

A workflow instance 18 may be executed (or processed) based on one or more workflow execution engines 20. As such, each execution engine 20 may follow a specific execution path, subset of a workflow instance 18, in the processing of one or more objects 22 (e.g., business objects). For example, a business object may be an electronic representation of an entity used and manipulated within business processes (e.g., the processes of issuing of insurance, designing a machine component etc.). In example embodiments, a business object may be an electronic component of a real-world object (e.g., a file pointing to a hard copy of a contract, or a completely virtual or electronic object (e.g., an electronic drawing of a component of a machine)). As such, an execution engine 20 may trigger manipulation of one or more objects 22 when implementing a specific workflow instance 18.

In summary, within the example audit system 10, a distinction is made between a workflow model 14 and versions 16 thereof. Workflow instances 18 may be processes that are controlled by an execution engine 20 at run time of the audit system 10, and may cause interaction with a user.

The audit system 10 further includes a workflow audit monitor 24 that is responsible for obtaining audit information from the workflow system 12, and the execution engine 20. In one example embodiment, the workflow audit monitor 24 requests and receives context information, in the example form of workflow model information identifying a workflow model 14 and version information identifying one or more model versions 16 from the workflow system 12. In other embodiments, other workflow context information identifying specific parameters, identifying context pertaining to the manipulation, processing and/or execution of an object may be obtained by the workflow audit monitor 24.

The workflow audit monitor 24 further requests and receives audit information in the form of execution information from one or more execution engines 20 responsible for the execution of a specific workflow instance 18. In an example embodiment, the execution information identifies an execution path, specified in terms of a specific workflow instance 18, followed by an execution engine 20 in the processing of an object 22. An execution path may include a particular subset of tasks that are followed from the beginning to the end of processing a workflow model instance.

Further, as shown in FIG. 1, the workflow audit monitor 24 is responsible for the association of audit information 25 with an object 22 processed by an execution engine 20 in terms of a specific workflow instance 18. In one example embodiment, the audit information 25 includes context information 26 and execution information 28, gathered from the workflow system 12 and one or more execution engines 20, respectively. The association of the audit information 25 may be achieved by attaching the audit information 25 to the object 22 so that the audit information 25 is stored as part of the object 22. In any event, in one embodiment, the attaching of the audit information 25 is performed such that the audit information 25 is stored in a decentralized fashion with respect to business objects, and not in a centralized database. This decentralized storage of audit information 25, in a manner so that it is attached to a business object, enables various entities that have access to an object 22 to utilize the attached audit information 25 for various auditing functions, examples of which are discussed in further detail below.

It will furthermore be noted from FIG. 1 that, in one example embodiment, a workflow audit monitor 24 may communicate with multiple execution engines 30, potentially operated by other principals participating in a workflow model 14. As such, the workflow audit monitor 24 may be configured to communicate with a set of execution engines, each set working on one or more objects 22. In a distributed and collaborative environment, each of the multiple execution engines may be operated by a different entity (e.g., principal) that are operationally and/or technically independent and/or distinct from each other, but nonetheless collaborate with respect to the workflow system 12.

Figure 2:
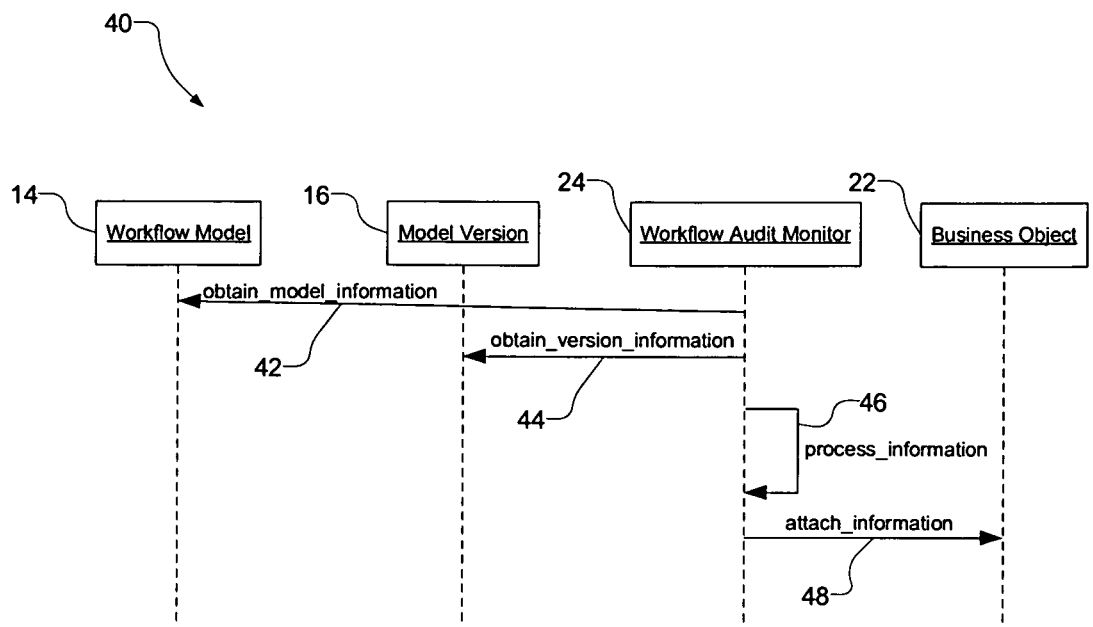
FIG. 2 is an interaction diagram illustrating a method, according to an example embodiment, to generate and attach context information to a business object.

FIG. 2 is an interaction diagram illustrating a method 40, according to an example embodiment, to gather context information pertaining to a business object, to process the context information and attach the context information 26 to an object. The method 40 commences with the workflow audit monitor 24 requesting and receiving, at operation 42, model information from a workflow model 14. Such model information may include the ordering of tasks, but possibly also other information such as associated roles, organizational units, associated applications, data sinks etc.

The workflow audit monitor 24, at operation 44 further requests and receives version information from one or more model versions 16. Such version information may be, for example, time of version change, person or system doing the change and model specific parameters that were changed (e.g. branching condition values).

The workflow audit monitor 24 then proceeds to process the received context information at operation 46. In one embodiment, the processing of the context information may include creating a hash value of the received model information and/or the received version information. The hash may be a number generated from a file containing the model and version information, and may be substantially smaller than the file itself. Further, the generated hash may be generated utilizing a formula in such a way that it is unlikely that some other file will produce the same hash value. Accordingly, the hash value generated at operation 46 may, in one example embodiment, serve as a unique fingerprint for the received model and version information.

Having processed the received model and version information, the workflow audit monitor 24 then proceeds to attach audit information to the business object 22 at operation 48. In one embodiment, the attached audit information may comprise the model and version information itself. In a further embodiment, the attached audit information may be derived from the model and version information (e.g., may comprise the above described processed information).

Figure 3:
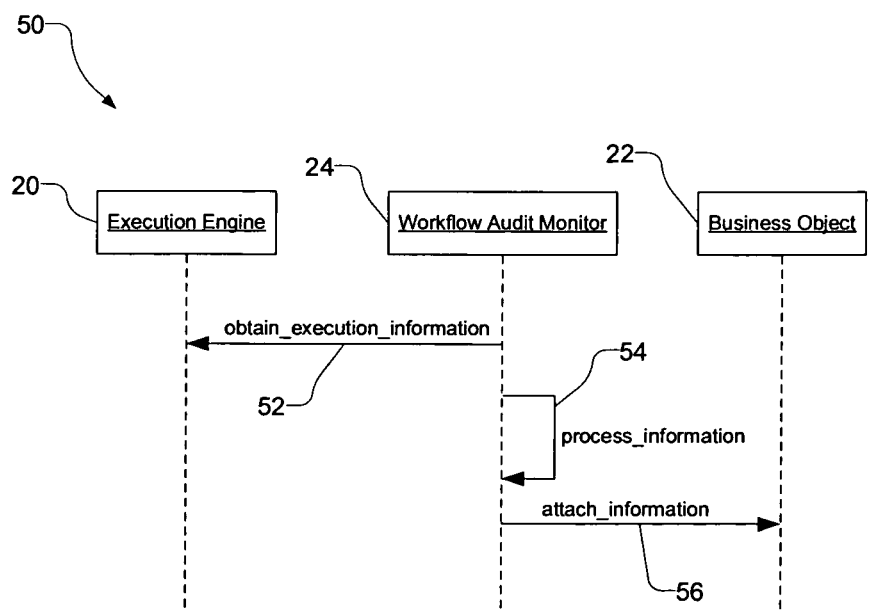
FIG. 3 is an interaction diagram illustrating a method, according to an example embodiment, to generate and attach execution information to a business object.

FIG. 3 is an interaction diagram illustrating a method 50, according to an example embodiment, to collect execution information associated with an object 22 (e.g., a business object). In a manner similar to the method 40 described above with reference to FIG. 2, the workflow audit monitor 24 may, at operation 52, request and receive execution information, pertaining to a particular business object 22, from one or more execution engines 20. Execution information may relate to a chosen execution path, as well as values and user interaction that led to the determination of the execution path. For example, an execution engine 20 may record that certain operations [a, b, d] were performed and that operation [c] was not necessary as some monetary amount (e.g., a credit value) was below a certain threshold. An execution engine 20 may also record which role or concrete identity performed a task.

At operation 54, the workflow audit monitor 24 may then process the received execution information to thereby generate further audit information. Again, the processing of the execution information at operation 52 may include generating a hash value based on a file including the execution information received at operation 52.

The workflow audit monitor 24, at operation 56, then proceeds to attach the audit information 25 to the business object 22. Again, the attached audit information may comprise the execution information received at operation 52, or the audit information derived from the execution information via the processing operation described above has been performed at operation 54.

The attaching of audit information, by the workflow audit monitor 24, to a business object 22 has been described as being performed at operations 48 and 56 above. The attaching of this audit information to a business object 22 may be achieved in a number of ways. In one embodiment, the workflow audit monitor 24 may store the audit information such that it is attached to, or incorporated within, a respective business object 22. For example, the audit information may be included within a metadata pertaining to the business object 22. Further, the audit information may be included as header information with respect to a business object 22, or may be included within a common digital container (or wrapper) in which the business object 22 is contained.

Figure 4:
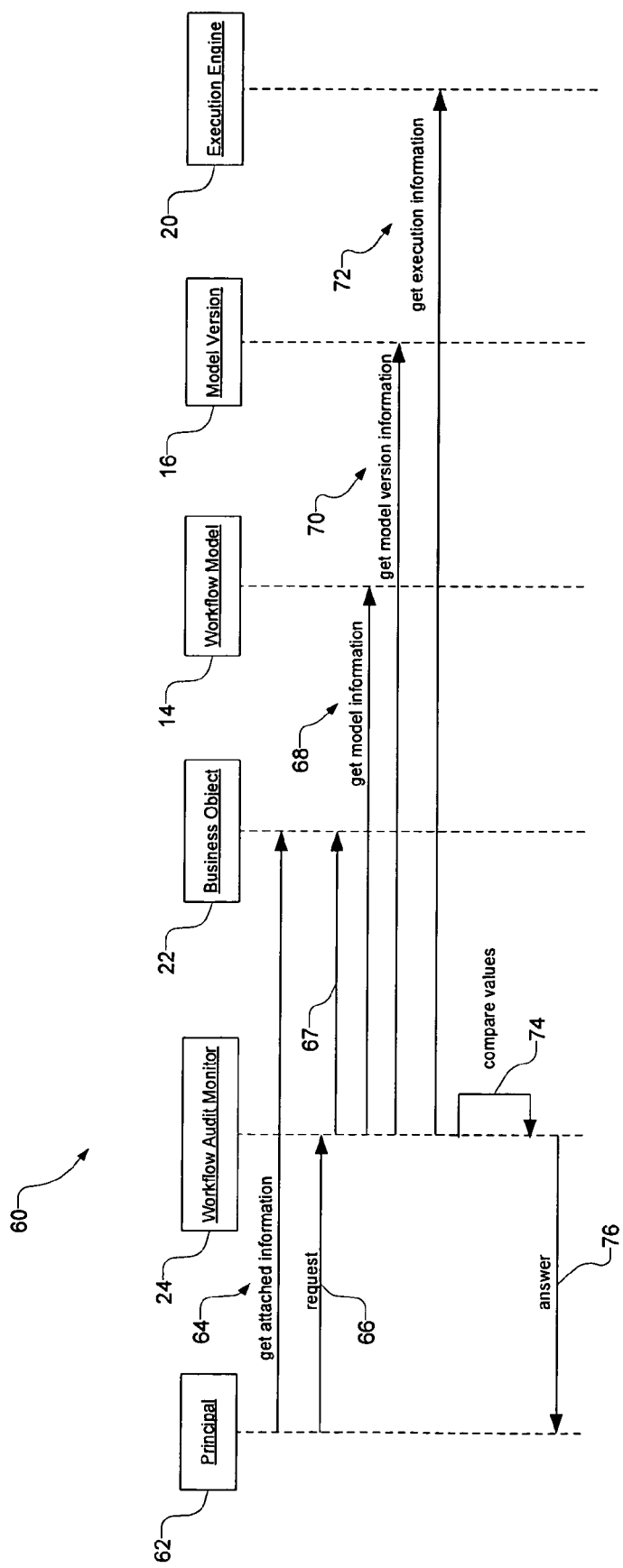
FIG. 4 is an interaction diagram illustrating a method, according to an example embodiment, to retrieve context and execution information associated with a business object and to compare the associated context and execution information with context and execution information retrieved from the workflow model and an execution engine.
Figure 5:
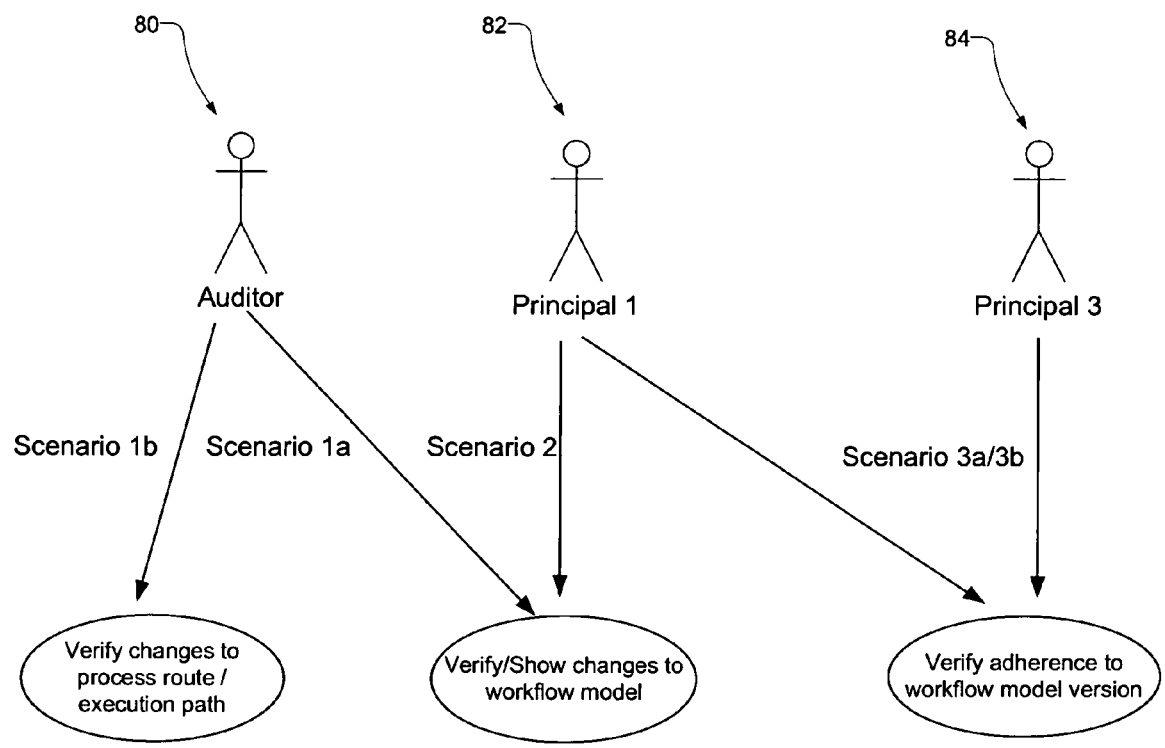
FIG. 5 is a diagram illustrating multiple example use scenarios in which the example embodiments may be utilised to provide audit functionality.

FIG. 4 is an interaction diagram illustrating a method 60, according to an example embodiment, to retrieve context and execution information associated with the business object responsive to an audit request, to compare the associated context and execution information with context and execution information retrieved from a workflow system and an execution engine, and to return an audit answer to a principal of a workflow (e.g., a collaborative workflow). It will be appreciated that, in different scenarios, different information may be requested from, and provided to, the various entities involved in a workflow. The information may, for example, depend on the principal (or principals) involved and the specific interests of such principals. The method 60, described below with reference to FIG. 4, is a description of a general flow. A number of example and more specific scenarios will then be discussed subsequent to the discussion of FIG. 4 with reference to FIG. 5.

The method 60 commences at operation 64, with the retrieval, by a principal 62 involved in a workflow (e.g. a collaborative workflow) of audit information 25, in the example form of context and execution information, that is attached to (or associated with) a business object. Principals may be authorised to retrieve the information (e.g., the business object and associated audit information 25) in order to protect against random querying.

At operation 66, the principal 62 issues an audit request to a workflow audit monitor 24. In one example embodiment, the audit request may be for a simple YES/NO determination as to whether the business object 22 had been processed, by one or more execution engines 20, in accordance with certain expectations or standards. For example, these expectations may be that the business object 22 was processed based on a specific workflow model 14, and a specific model version 16. The expectation may be that a specific workflow instance 18 was utilized, leading to a concrete execution path by an execution engine 20 and subsequent processing of the business object 22. The audit request, issued at operation 66, may further indicate whether a simple YES/NO audit response or answer is requested, or whether the audit answer should be more comprehensive and provide specifics regarding deviations from, or compliance with, any expectations or standards in connection with processing of the business object 22. Where the audit answer returned by the workflow audit monitor 24 is based on internal processes and/or confidential information of a further entity (e.g. a further principal), the audit answer returned by the workflow audit monitor 24 may be restricted to a simple YES/NO answer.

In any event, the audit request may itself include the associated audit information 25 retrieved by the principal 62 from the business object 22 at operation 64. In an alternative embodiment, the audit request may not include the associated audit information, in which case, at operation 67, the workflow audit monitor 24 may itself issue a request to the business object 22 for the associated audit information 25 which may comprise one or more hash values, as described above with reference to FIG. 2 and FIG. 3

Responsive to the audit request at operation 66, the workflow audit monitor 24 may then issue requests to a number of entities in an audit system 10, for appropriate information. For example, a first request 68 may be issued by the workflow audit monitor 24 to a workflow system 12 for workflow model information specific to a workflow model. A second request 70 may be issued by the workflow audit monitor 24 to a workflow system 12 for model version information pertaining to a particular model version 16 involved in processing of the relevant business object 22. A further request 72 may be issued by the workflow audit monitor 24 to one or more execution engines 20 for execution information that identifies an execution path subset of a specific workflow instance, followed by the relevant execution engine 20 when processing of the business object 22.

At operation 74, the workflow audit monitor 24 then compares the audit information attached to business object 22 with retrieved audit information, which comprises (or is derived from) information returned responsive to the requests 68, 70 and 72. In one example embodiment, the comparison of the associated and retrieved audit information may include generating a hash value from the retrieved audit information, received responsive to the requests 68, 70 and 72, and comparing the generated hash value to a hash value that comprises the associated audit information of the business object 22.

At operation 76, the workflow audit monitor 24 then returns an audit answer to the principal 62. The audit answer may be based on the comparison of the associated and retrieved audit information performed at operation 74. In various example embodiments, the audit answer returned by the workflow audit monitor 24 to the principal 62 at operation 76 may comprise a simple YES/NO answer, indicating whether or not the associated and retrieved audit information correspond or not. In alternative embodiments, the returned audit answer 76 may be more detailed information, including specifics regarding whether an entity (e.g., a business partner) complied with, or deviated from certain expectations or standards.

Three example use case scenarios will be now be described, each of the described use case scenarios representing specific examples of the general method 60 described above with reference to FIG. 4. Each of these example scenarios are discussed with reference to FIG. 5.

In a first scenario (scenario 1a), an auditor 80 may wish to know about changes to a workflow model 14 regarding the manipulation of a specific business object 22. To this end, the auditor 80 queries the workflow audit monitor 24 regarding changes to object types, or specific workflow instances 18, and expects an audit answer in the form of a YES/NO answer. In the scenario, if there had been changes to either the object types or the relevant workflow instances 18 that guided one or more execution engines 20, then the auditor 80 may be required to trace supporting change documents and sign offs. However, utilizing the audit system 10, the auditor 80 does not need be exposed to the full internal structure of a workflow system 12. As described below, the workflow system 12 may, in a collaborative workflow, embody certain sensitive information of one or more principals. Accordingly, the auditor 80 may, utilizing audit system 10, be screened from such sensitive information. Accordingly, in the above described scenario (scenario 1a), the audit request received by the workflow audit monitor 24 from the auditor 80 includes a query regarding changes to a workflow model 14, with respect to business object type, or a workflow instance 18. The audit answer, returned by the workflow audit monitor 24 to the auditor 80, is a YES/NO answer, including model version information.

Turning now to a second scenario (scenario 1b), assume a deviation at run time from a prescribed workflow model 14, but not a change in the workflow model 14 itself. This second scenario is based on an observation that it is sometimes not realistic to expect a workflow to be followed step by step in every instance, and that it may be necessary allow for exceptions in certain instances. For example, a responsible employee involved in the execution of a workflow model 14 may be ill. In such a scenario, it may be desirable to accommodate a deviation from the process route/execution path as described by the workflow model 14, without changing the model itself. However, such a deviation should be noted and attached as audit information to the relevant business object 22.

In the second scenario (scenario 1b), an auditor 80 may pose a query (in the form of an audit request) regarding any such changes, with respect to a set of business objects 22, and may expect to receive an audit answer indicating whether or not there had been deviations. Accordingly, in this scenario, the audit request that is issued from the auditor 80 to the workflow audit monitor 24 may be specifically directed towards determining whether any changes to an execution path, as specified in terms of a workflow instance 18, have occurred in the processing of a business object 22.

The audit answer, returned by the workflow audit monitor 24 to the auditor 80, may comprise a simple YES/NO answer.

In a further scenario (scenario 2), a principal 82 involved in a collaborative workflow may wish to determine or not whether there have been any changes to a workflow model 14 in connection with the manipulation of a specific business object 22. Further, the principal 82 may wish to know what such changes entailed. This scenario differs from scenario 1a in that the principal 82 may already have information about the workflow model 14, and may be looking to the workflow audit monitor 24 to provide more detailed information regarding any changes to the workflow model 14.

Accordingly, in scenario 2, the audit request issued from the principal 82 may be specifically regarding a workflow model 14 (with respect to a business object type) or a workflow instance 18 (with respect to the processing of a specific business object 22). The audit answer provided by the workflow audit monitor 24, in scenario 2, may include a YES/NO answer, as well as version information regarding particular model version 16, and a detailed description of changes in connection with a business object type and exhibited in that particular workflow instance 18.

Turning now to a further scenario, scenario 3a, assume that two partners collaborating in a workflow wish to verify that the other partner has followed certain procedures in the manipulation of a business object. In this example embodiment, the nature of the collaborative workflows between the entities (e.g., principal 82 and principal 84) may distinguish between a global workflow, and private sub-workflows. Each principal may have information concerning only a certain part of a whole collaborative workflow system 12, but not know how other partners arrange and execute their work. For example, such a collaborative workflow system 12 may be deployed in the production of pharmaceuticals, or in complex engineering projects.

In the example scenario, assuming that principal 84 receives a recipe from business partner, namely principal 82. Principal 84 may wish to ensure that the recipe was approved by principal 82 following a set of procedures. For example, in the production of pharmaceuticals, principal 84 may wish to ensure that a set of clinical tests have been adhered to. Such tests and the general approval process may change, subject to strict legal regulations (e.g. by the Food and Drug Administration (FDA)).

In this example scenario, principal 84 may take information concerning an execution path followed by an execution engine 20 (e.g., the execution information discussed above with reference to FIGS. 2-4) from a relevant business object 22, and communicate this execution information to a workflow audit monitor 24. The workflow audit monitor 24 will then verify to principal 84, by way of an audit answer, that the execution path followed by principal 82 was as described by a specific workflow model 14. This verification may be done without revealing to principal 84 how the particular execution path was followed by principal 82.

Accordingly, in this example scenario, the audit request, provided by the principal 84 to the workflow audit monitor 24, may comprise execution information in the example form of a hash of an execution path stored as audit information in association with the relevant business object 22. The audit answer returned by the workflow audit monitor 24 to the principal 84 may comprise a YES/NO answer only.

Considering now a further scenario, scenario 3b, assuming that two partners (e.g., principal 82 and principal 84) are collaborating in a workflow system 12, and that they wish to verify that they have both followed the same model version 16 in the manipulation of business object 22. For example, the principal 82 may receive a contract from principal 84, and wish to verify that he and principal 84 followed the same workflow model version 16 in the manipulation of this business object 22.

In this scenario, both the principal 82 and the principal 84 may send context information (e.g., workflow model and version information) attached to, or associated with, a relevant business object 22 to the workflow audit monitor 24. The workflow audit monitor 24 may compare this context information in order to generate an audit answer. In summary, the audit request may include requests from each of the principals 82 and 84, and comprise a hash of a workflow model and workflow version information, and the audit answer may comprise a simple YES/NO answer.

From the above example scenarios, it will be appreciated that the storage of audit information and association thereof with a business object, and the provision of independent workflow audit monitor 24 responsible for attaching, retrieving and comparing such audit information, may allow organisationally independent entities to issue queries regarding a collaborative workflow system 12, and receive assurances regarding such a collaborative workflow system, in a manner that may not expose confidential information regarding other entities.

Figure 6:
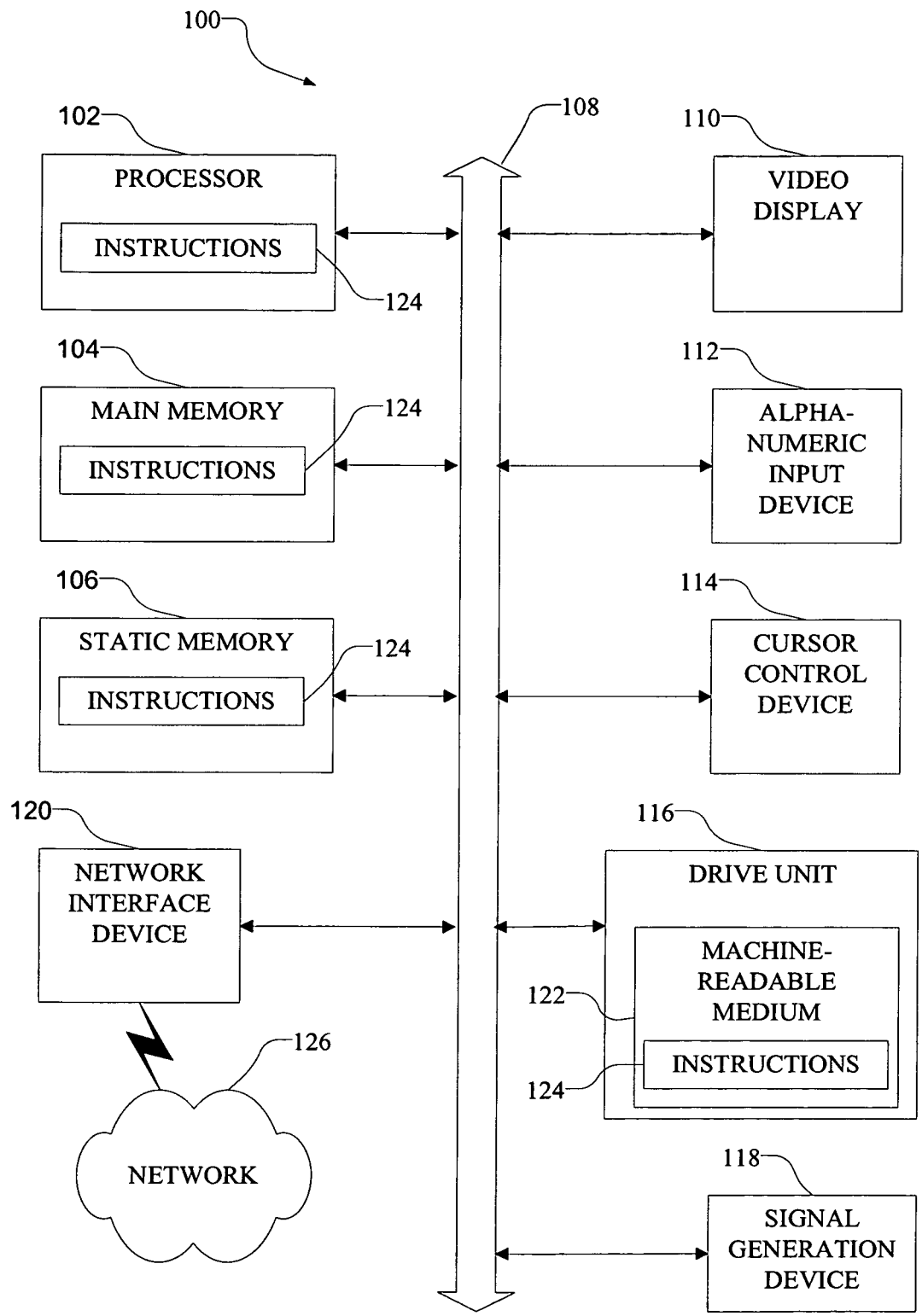
FIG. 6 shows a diagrammatic representation of machine in the example form of a computer system within which instructions, for causing the machine to perform any one or more of the methodologies discussed herein, may be executed.

FIG. 6 shows a diagrammatic representation of machine in the example form of a computer system 100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a user interface (UI) navigation device 114 (e.g., a mouse), a disk drive unit 116, a signal generation device 118 (e.g., a speaker) and a network interface device 120.

The disk drive unit 116 includes a machine-readable medium 122 on which is stored one or more sets of instructions and data structures (e.g., software 124) embodying or utilized by any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120 utilizing any one of a number of well-known transfer protocols (e.g., HTTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system including:
a non-transitory memory to store a workflow model having at least one version, the at least one version being executable by an execution engine as a specific workflow instance, the specific workflow instance associated with context information, the context information comprising model information identifying the workflow model and version information identifying the at least one version of the workflow model; and
a processor to implement a workflow data monitor to receive and associate audit information with an object processed by an execution engine in terms of the specific instance of the workflow model, the audit information comprising the context information and execution information, the workflow data monitor further to receive an audit request with respect to the object processed in terms of a specific workflow instance and, responsive to receipt of the audit request with respect to the object is to:
retrieve the associated audit information associated with the object;
retrieve further audit information from at least one of the workflow model and the execution engine; and
compare the associated audit information with the further audit information.

2. The system of claim 1, wherein the workflow data monitor is to store the audit information such that it is attached to the object.

3. The system of claim 1, wherein the receiving of the audit information includes receiving execution information pertaining to execution by the execution engine of the specific instance of the workflow model.

4. The system of claim 3, wherein the execution information identifies an execution path, specified by the specific workflow instance, followed by the execution engine in processing of the object.

5. The system of claim 1, wherein the specific workflow instance is characterized by at least one principle and at least one object.

6. The system of claim 1, wherein the workflow data monitor is to process the audit information prior to associating the audit information with the object.

7. The system of claim 6, wherein the workflow data monitor is to process the audit information by creating a hash value based on the audit information.

8. The system of claim 1, wherein the workflow data monitor is to generate an audit result based on the comparison of the associated audit information with the further audit information.

9. The system of claim 8, wherein the audit result indicates whether or not the associated audit information corresponds to the further audit information.

10. A method including:
    receiving, as a workflow monitor, audit information generated in connection with processing of an object by an execution engine in terms of a specific instance of a workflow model, the specific workflow instance associated with context information, the context information comprising model information identifying the workflow model and version information identifying the at least one version of the workflow model;
    using one or more processors, associating the audit information with an object such that the audit information is stored in a decentralized manner in association with the object, the audit information comprising the context information and execution information;
    receiving an audit request with respect to the object processed in terms of the specific instance of the workflow model;
    retrieving the associated audit information associated with the object;
    retrieving further audit information from at least one of the workflow model and the execution engine; and
    comparing the associated audit information with the further audit information.

11. The method of claim 10, wherein the associating of the audit information with the object includes storing the audit information such that it is attached to the object.

12. The method of claim 10, wherein the receiving of the audit information includes receiving, at the workflow for data monitor, execution information pertaining to execution of the specific instance of the workflow model.

13. The method of claim 12, wherein the execution information identifies an execution path, within the specific instance of the workflow model, followed by the execution engine in processing of the object.

14. The method of claim 10, wherein the specific instance of the workflow model is characterized by at least one principle and at least one object.

15. The method of claim 10, including processing the audit information prior to associating the audit information with the object.

16. The method of claim 15, wherein the processing of the audit information includes creating a hash value based on the audit information.

17. The method of claim 10, including generating an audit result based on the comparison of the associated audit information with the further audit information.

18. The method of claim 17, wherein the audit result indicates whether or not the associated audit information corresponds to the further audit information.

19. A system including:
    a non-transitory memory to store a workflow model having at least one version, the at least one version being executable by an execution engine as a specific workflow instance, the specific workflow instance associated with context information, the context information comprising model information identifying the workflow model and version information identifying the at least one version of the workflow model; and
    means for receiving and associating audit information with an object processed by an execution engine in terms of the specific instance of the workflow model, the audit information comprising the context information and execution information, the means further to receive an audit request with respect to the object processed in terms of a specific workflow instance and, responsive to receipt of the audit request with respect to the object is to:
    retrieve the associated audit information associated with the object;
    retrieve further audit information from at least one of the workflow model and the execution engine; and
    compare the associated audit information with the further audit information.

20. A non-transitory machine-readable medium including instructions that, when executed by a machine, cause the machine to perform operations comprising:
    receiving, as a workflow monitor, audit information generated in connection with processing of an object by an execution engine in terms of a specific instance of a workflow model, the specific workflow instance associated with context information, the context information comprising model information identifying the workflow model and version information identifying the at least one version of the workflow model;
    associating the audit information with an object such that the audit information is stored in a decentralized manner in association with the object, the audit information comprising the context information and execution information;
    receiving an audit request with respect to the object processed in terms of the specific instance of the workflow model;
    retrieving the associated audit information associated with the object;
    retrieving further audit information from at least one of the workflow model and the execution engine; and
    comparing the associated audit information with the further audit information.

* * * * *